US007162241B2

(12) United States Patent
Kim et al.

(10) Patent No.: US 7,162,241 B2
(45) Date of Patent: Jan. 9, 2007

(54) METHOD FOR MANAGING MULTICAST GROUP IN MOBILE COMMUNICATION SYSTEM

(75) Inventors: Eun-Jung Kim, Seoul (KR); Jin-Young Park, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 484 days.

(21) Appl. No.: 10/439,317

(22) Filed: May 16, 2003

(65) Prior Publication Data

US 2004/0029616 A1 Feb. 12, 2004

(30) Foreign Application Priority Data

May 18, 2002 (KR) ................ 2002-27640

(51) Int. Cl.
*H04Q 7/20* (2006.01)
(52) U.S. Cl. ................ 455/435.2; 455/412.2; 455/414.1; 455/456.1; 455/3.06; 455/450; 370/260; 370/390; 370/401; 370/432; 709/204; 709/227; 709/236; 714/751; 714/752; 714/760
(58) Field of Classification Search ........... 455/3.06, 455/412.2, 435.2, 450; 370/260, 390, 401, 370/432; 709/204, 227, 236; 714/751, 752
See application file for complete search history.

(56) References Cited

U.S. PATENT DOCUMENTS

| 6,556,542 | B1 * | 4/2003 | Sudo et al. ............ 370/236.1 |
| 6,600,917 | B1 * | 7/2003 | Maupin ................ 455/414.1 |
| 6,611,510 | B1 * | 8/2003 | Marples et al. ........... 370/335 |
| 6,650,905 | B1 * | 11/2003 | Toskala et al. ........... 455/522 |
| 6,701,155 | B1 * | 3/2004 | Sarkkinen et al. ......... 455/515 |
| 6,741,575 | B1 * | 5/2004 | Zhang et al. ............. 370/329 |
| 6,763,236 | B1 * | 7/2004 | Siren .................... 455/450 |
| 6,829,232 | B1 * | 12/2004 | Takeda et al. ............ 370/352 |
| 6,839,565 | B1 * | 1/2005 | Sarkkinen et al. ......... 455/503 |
| 6,845,238 | B1 * | 1/2005 | Muller .................. 455/436 |
| 6,895,216 | B1 * | 5/2005 | Sato et al. .............. 455/3.06 |
| 6,907,245 | B1 * | 6/2005 | Ohlsson et al. ........... 455/442 |
| 6,959,009 | B1 * | 10/2005 | Asokan et al. ............ 370/475 |
| 6,961,349 | B1 * | 11/2005 | Malomsoky et al. ........ 370/469 |
| 6,999,753 | B1 * | 2/2006 | Beckmann et al. ........ 455/412.2 |

FOREIGN PATENT DOCUMENTS

EP 1183820 3/2002

(Continued)

OTHER PUBLICATIONS

Tabbane, Sami, "Location Management Methods for Third-Generation Mobile Systems," IEEE Communications Magazine, vol. 35, pp. 72-78, Aug. 1997.

*Primary Examiner*—Marceau Milord
(74) *Attorney, Agent, or Firm*—Fleshner & Kim, LLP (57) ABSTRACT

A multicast service of a 3GPP Universal Mobile Telecommunications System (UMTS) is disclosed. By allowing an RNC to manage multicast group member information by multicast services on multicast areas, when a user terminal being currently provided with an MBMS service moves, the RNC sends information on the movement of the terminal to a core network. Since the RNC notifies the core network of the terminal's movement selectively on the basis of the multicast group member information by multicast services on the multicast area, the network resource can be effectively used, and especially, unnecessary transmission of terminal's movement information from the RNC to the multicast group managing entity of the core network can be prevented.

21 Claims, 5 Drawing Sheets

FOREIGN PATENT DOCUMENTS

WO WO 99/16266 A1 4/1999
WO WO 00/74312 A1 12/2000

* cited by examiner

FIG.5 ns the overall admission procedure.
METHOD FOR MANAGING MULTICAST GROUP IN MOBILE COMMUNICATION SYSTEM

BACKGROUND OF THE INVENTION

1. Field of the Invention

The present invention relates to a multicast service of a 3GPP universal mobile telecommunications system (UMTS) system and, more particularly, to a method for managing a multicast group according to movement of a terminal.

2. Description of the Background Art

A universal mobile telecommunications system (UMTS) is a third generation mobile communication system that has evolved from a standard known as Global System for Mobile communications (GSM). This standard is a European is standard which aims to provide an improved mobile communication service based on a GSM core network and wideband code division multiple access (W-CDMA) technology.

In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work toward standardizing the UMTS performed by the 3GPP has resulted in the formation of five technical specification groups (TSG), each of which is directed to forming network elements having independent operations.

More specifically, each TSG develops, approves and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

Figure 1:
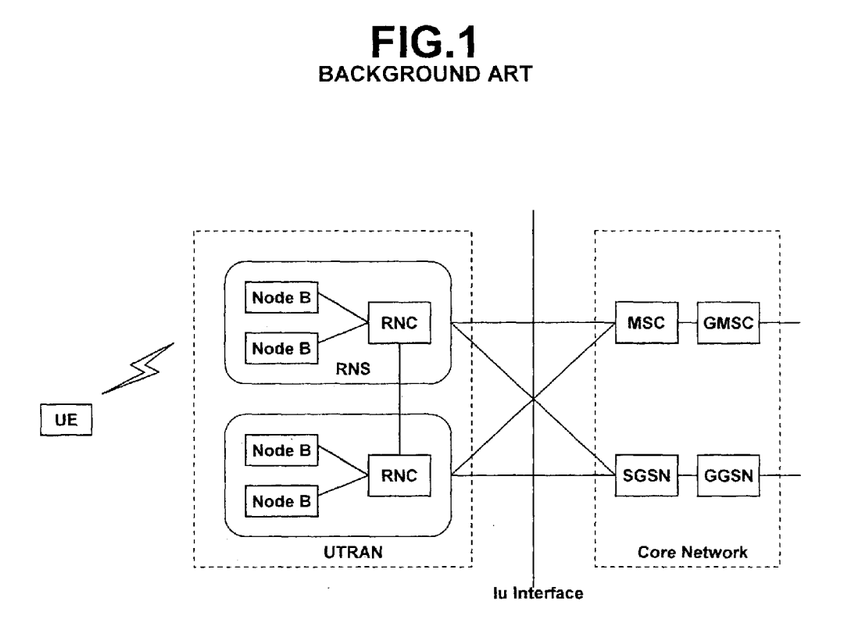
FIG. 1 illustrates a network structure of a general UMTS system.

FIG. 1 illustrates an example of the construction of a general UMTS network.

The UMTS is roughly divided into a terminal, a UTRAN and a core network.

The UTRAN includes one or more radio network subsystems (RNS). Each RNS includes an RNC and one or more Node Bs managed by the RNCs.

Node Bs are managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for terminal.

The RNCs perform functions which include assigning and managing radio resources, and operate as an access point with respect to the core network.

The UTRAN constructs and maintains a radio access bearer (RAB) for communication between the terminal and the core network. The core network requests end-to-end quality of service (QoS) requirements from the RAB, and the RAM supports the QoS requirements the core network has set. Accordingly, by constructing and maintaining the RAB, the UTRAN can satisfy the end-to-end QoS requirements.

The services provided to the specific terminal is roughly divided into a circuit switched service and a packet switched service. For example, a general voice phone call service belongs to the circuit switched service, while a Web browsing service through an Internet connection is classified as the packet switched service.

In case of supporting the circuit switched service, the RNC is connected to the MSC of the core network, and the MSC is connected to a GMSC (Gateway Mobile Switching Center) managing a connection to other networks.

Meanwhile, in case of the packet switched service, services are provided by a SGSN (Serving GPRS Support Node) and a GGSN (Gateway GPRS Support Node) 37 of the core network.

The SGSN supports a packet communication going toward the RNC, and the GGSN 37 manages connection to other packet switched networks (i.e, the Internet network).

As the 3GPP system has decided to provide a multimedia broadcast multicast service (MBMS), a fresh service of Release 6, 3GPP TSG SA (Service and System Aspect) defines network elements required for the MBMS service and functions of each network element.

A cell broadcast service the conventional Release 99 has provided is limited to a service that a text type short message is broadcast to a certain area. Comparatively, the MBMS service provided by the Release 6 is an advanced service that not only broadcasts a multimedia but also multicasts the multimedia to terminals (UEs) which have subscribed for the corresponding service.

The MBMS will now be described in detail.

The MBMS, a downward-dedicated service, provides a streaming or background service to plural terminals by using a common or dedicated downward channel. The MBMS is divided into a broadcast mode and a multicast mode. The MBMS broadcast mode is a service transmitting multimedia data to every user located in a broadcast area, whereas the MBMS multicast mode is a service transmitting multimedia data to a specific user group located in a multicast area. The broadcast area signifies a broadcast service available area, and the multicast area signifies a multicast service available area.

Users who desire to receive the MBMS service should receive a service announcement and a service notification provided by a network. The service announcement means informing the terminal of a list of services to be provided and its related information, and the service notification means informing the terminal of information on broadcast data to be transmitted.

Especially, if the user intends to receive the multicast mode MBMS service, he/she should be admitted to a multicast subscription group. The multicast subscription group means a group of users who has finished an admission procedure. Once the user is admitted to the multicast subscription group, he/she can join a multicast group to receive a specific multicast service. In this case, the multicast group signifies a user group receiving the specific multicast service, and 'joining' means joining the multicast group gathered to receive the specific multicast service.

The joining behavior is in other way called a MBMS multicast activation. Accordingly, the user can receive the specific multicast data through the MBMS multicast activation or the joining behavior.

Figure 2:
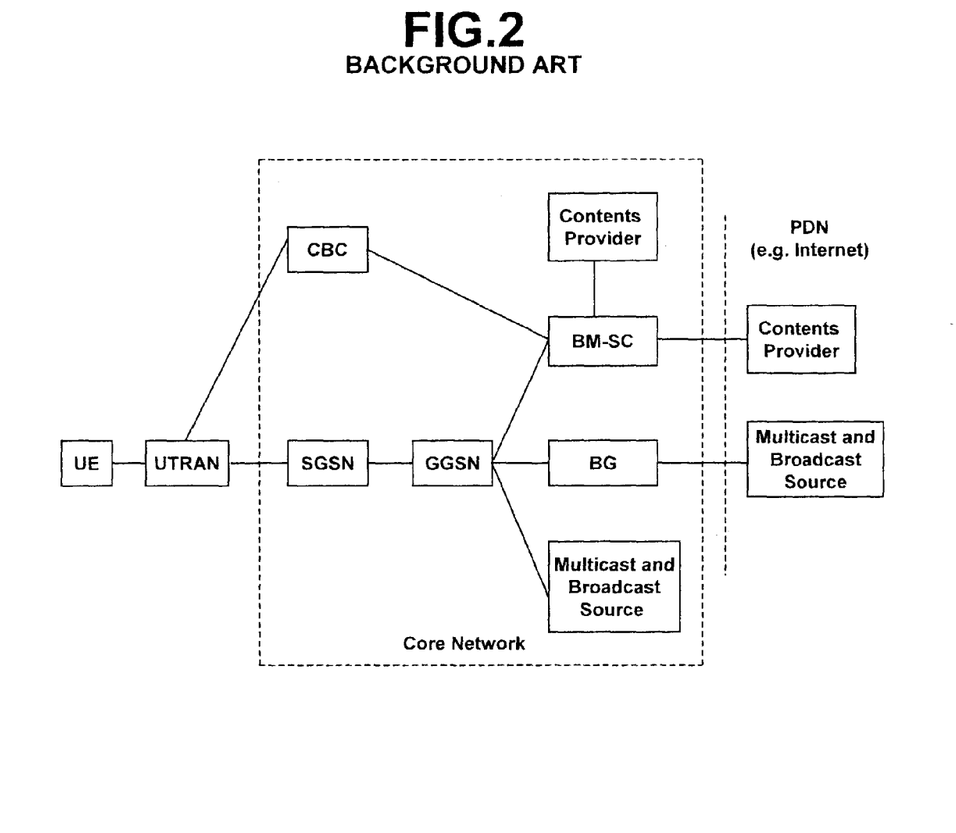
FIG. 2 illustrates a schematic network structure for providing an MBMS service in an UMTS system.

FIG. 2 shows a schematic network structure for providing the MBMS service.

As shown in FIG. 2, a broadcast multicast-service center (BM-SC) serves to schedule MBMS contents inputted from a contents provider. A cell broadcast center (CBC) is an entity (a physical or virtual unit handling a specific service) for providing an existing CBC service, that is, for broadcasting a text type short message to a certain area, and can be used for a service announcement of the MBMS service.

Meanwhile, in the case of the packet switched service, the MBMS service is provided by an SGSN (Serving GPRS Support Node) and a GGSN (Gateway GPRS Support Node) of the core network. The SGSN supports a packet communication toward a serving RNC (SRNC) of the UTRAN, and the GGSN manages connection to other packet switched networks such as the Internet through a border gateway (BG).

In the UMTS system, a GTP (GPRS Tunneling Protocol) layer is used to support transmission of the packet data. Specifically, the GTP layer is especially used for transmitting data of a service area. Thus, the GGSN manages a data transmission tunnel through the GTP layer in the existing UMTS packet domain, and generates and manages an MBMS context for the MBMS service.

Figure 3:
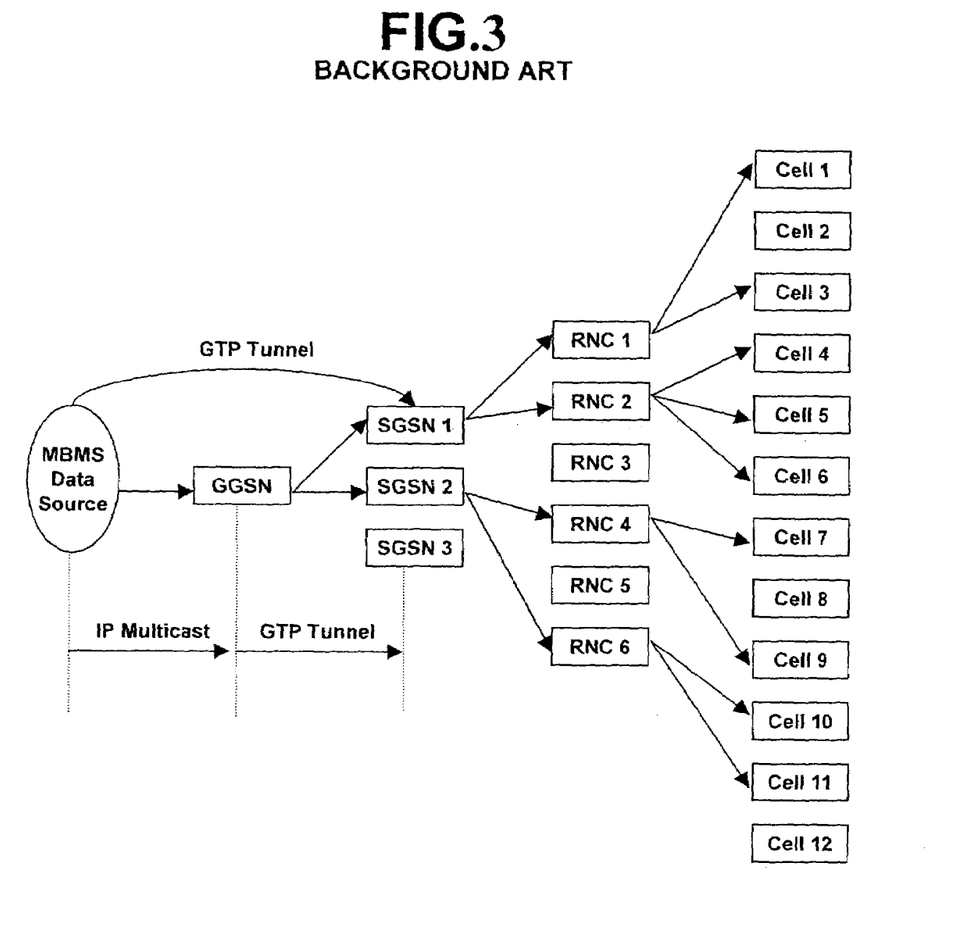
FIG. 3 illustrates a transmission path of an MBMS service data in the UMTS system.

FIG. 3 illustrates a transmission procedure of an MBMS data.

As shown in FIG. 3, data to be transmitted to members of the multicast group is delivered from an MBMS data source to the GGSN through an IP multicast, and the GGSN generates a GTP tunnel and transmits an MBMS data to the SGSNs which manage users subscribed for the corresponding multicast service. Each SGSN routes the MBMS data to each RNC managing corresponding users, and the RNC transmits the received MBMS data to a corresponding user cell (the area managed by one Node B).

Accordingly, the specific MBMS service user located in the cell, that is, the specific terminals located in the corresponding multicast area, can be provided with the MBMS service upon receiving the MBMS data.

If the BM-SC includes the function of the GGSN, the MBMS data can be directly delivered to the SGSN without passing through the GGSN, and the data would be transmitted to the other entities in the same manner.

As mentioned above, the MBMS service is divided into the broadcast mode service and the multicast mode service. Unlike the broadcast mode service which broadcasts to all the area, the multicast mode service transmits data only to the users (terminals) admitted to the multicast group, of which the data is provided in a unidirectional point-to-multipoint transport method.

When the multicast service is provided, information on which multicast group a user terminal currently belongs to is necessary. In addition, unlike a cable network, the user terminal is moved in the radio network, so that management of the multicast group according to the mobility of the terminal is requisite. If a user terminal moves while being provided with the MBMS service, the mobility information of the corresponding terminal should be sent to a multicast group managing entity.

However, currently, the 3GPP defines only the requirements for the MBMS service, and no substantial matters have been discussed as to what information should be delivered between elements of the network nor as to on the basis of what information which element of the network should manage the multicast group, and in addition, as to whether the mobility information of the terminal should be unconditionally delivered to the entity managing the multicast group if the terminal is moved while being provided with the multicast service.

Therefore, if the terminal being currently provided with the multicast service is moved, there is a possibility that the service provided to the terminal is interrupted. In addition, if the mobility information of the all the terminals is unconditionally delivered to the entity managing the multicast group, the network resource is not effectively used due to the unnecessary signaling.

The above references are incorporated by reference herein where appropriate for appropriate teachings of additional or alternative details, features and/or technical background.

SUMMARY OF THE INVENTION

Therefore, an object of the present invention is to provide a method for managing a multicast group of a mobile communication system in which an RNC can selectively notify a core network of movement of a terminal.

Another object of the present invention is to provide a method for managing a multicast group of a mobile communication system in which an RNC can manage multicast group member information of by multicast services on multicast areas.

Still another object of the present invention is to provide a method for managing a multicast group of a mobile communication system that is capable of preventing unnecessary transmission of a signaling to an RNC by judging whether a terminal moved in a multicast area can be supported with respect to the service of the multicast area.

Yet another object of the present invention is to provide a method for managing a multicast group of a mobile communication system that is capable of successively providing a multicast service to a moved terminal.

To achieve at least the above objects in whole or in parts, there is provided a method for managing a multicast group of a system providing a multimedia broadcast/multicast service (MBMS), including: sensing movement of a terminal between multicast areas; and selectively notifying an entity managing a multicast group of the movement of the terminal by a network controller (RNC).

Preferably, the multicast group member information is each multicast service information on a multicast area (MA) managed by one RNC. In this case, the entity managing the multicast group can be one of broadcast multicast-service center (BM-SC), a serving GPRS support node (SGSN) and gateway GPRS (GGSN).

The method for managing a multicast group further includes: notifying movement of a terminal and updating multicast group member information by the RNC.

Preferably, the RNC determines whether to notify movement of a terminal by comparing movement information of the terminal and multicast group member information.

Preferably, if the terminal is moved to a different multicast area (MA) and the corresponding MA is managed by a different RNC, the RNC notifies a group managing entity of the movement of the terminal. In this case, the multicast area (MA) may provide the same or a different service as that of or from the previous multicast area.

Preferably, if the terminal moves to a different multicast area (MA) and the corresponding MA is managed by the same RNC, the RNC notifies the group managing entity of the movement of the terminal. In this case, the multicast area (MA) may provide the same service as that of the previous multicast area or a different service from that of the previous multicast area.

Preferably, if users for a certain service exceeds a predetermined number in the multicast area, the RNC notifies the multicast group managing entity of the movement of the terminal. In addition, even though users for a certain service in the multicast area does not exceed a predetermined number, if a QoS or a content of information is different between the multicast areas, the RNC notifies the multicast group managing entity of the movement of the terminal.

To achieve at least these advantages in whole or in parts, there is further provided a method for managing a multicast group of a multimedia broadcast/multicast service (MBMS) system in a mobile communication system, including: managing multicast group member information on multicast areas by multicast services by an RNC; sensing movement of a terminal between multicast areas; notifying a multicast core network of movement of the terminal by the RNC when multicast group member information is changed according to the movement of the terminal between the multicast areas.

Preferably, the RNC notifies a multicast group managing entity of the core network of the movement of the terminal. In such a case, the multicast group managing entity can be one of a broadcast multicast-service center (BM-SC), a serving GPRS support nod e(SGSN) and a gateway GPRS (GGSN).

The method for managing a multicast group of a mobile communication system of the present invention further includes: updating multicast group member information by the RNC when the terminal moves.

Preferably, if the terminal is moved to a different multicast area (MA) and the corresponding MA is managed by a different RNC, the RNC notifies a group managing entity of the movement of the terminal. In this case, the multicast area (MA) may provide the same or a different service as that of or from the previous multicast area.

Preferably, if the terminal moves to a different multicast area (MA) and the corresponding MA is managed by the same RNC, the RNC notifies the group managing entity of the movement of the terminal. In this case, the multicast area (MA) may provide the same or a different service as that of or from the previous multicast area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile communication system such as the UMTS (universal mobile telecommunications system) developed by 3GPP. Nonetheless, the present invention can be also adopted for a communication system operating in conformity to a different standard. Preferred embodiments of the present invention will now be described in detail.

The present invention proposes a method where, by allowing an RNC to manage multicast group member information by multicast services on multicast areas that the RNC itself manages, when a user terminal being currently provided with an MBMS service moves, the RNC sends information on the movement of the terminal to a core network. Preferably, the information on the movement of the terminal is transferred to a multicast group managing entity of the core network which can be one of an SGSN, a BM-SC and a GGSN.

In addition, the present invention proposes a method for selectively notifying the core network of information on movement of a user terminal by the RNC. That is, the RNC notifies the multicast group entity of the core network of the movement of the terminal for an effective of a network resource only when the number of multicast group members managed by itself changes according to the movement of the terminal between the multicast areas.

In general, when a multicast service is provided, there may be several types of services related to one multicast group or there may be several multicast groups for one multicast service.

Figure 4:
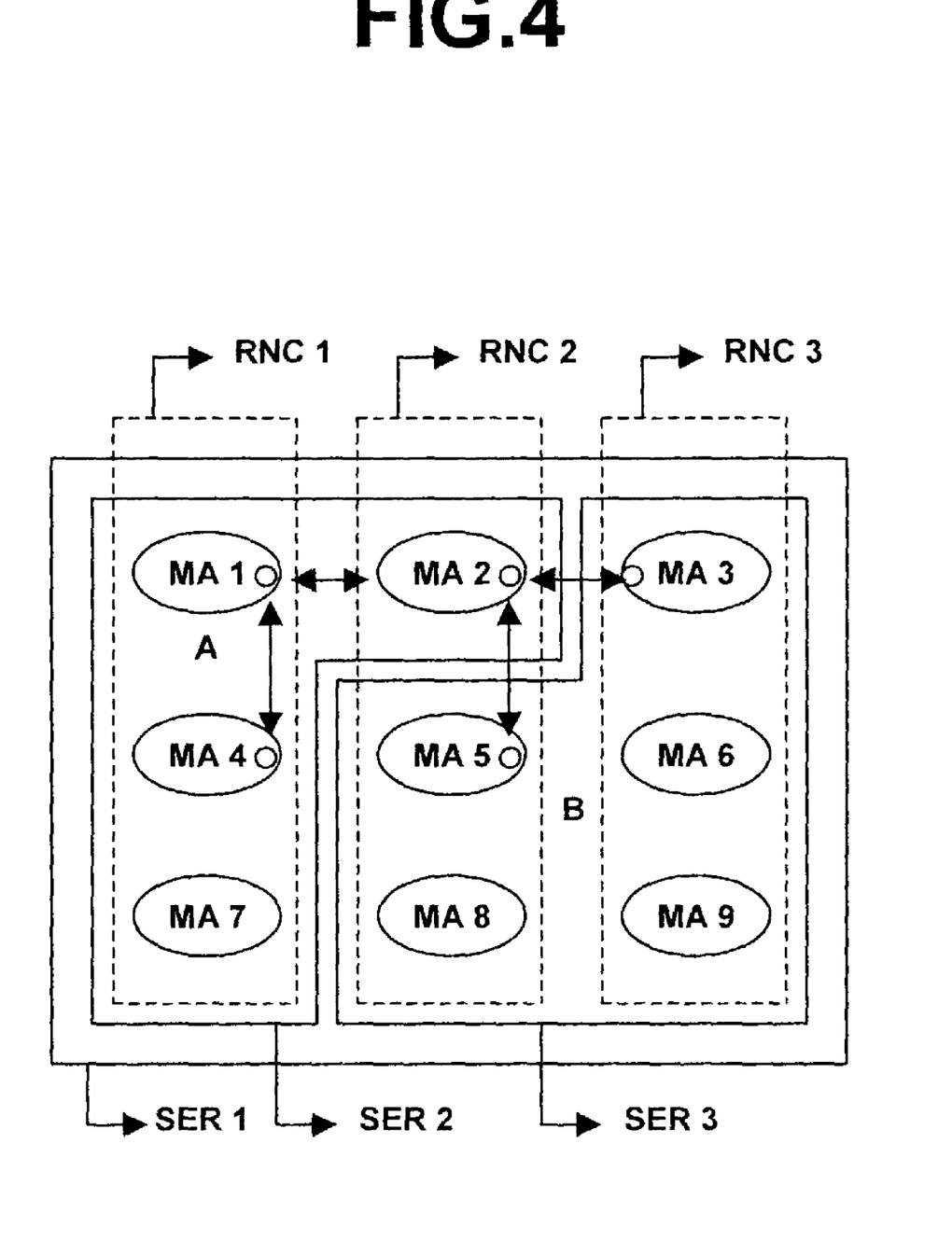
FIG. 4 illustrates a logical structure for providing a multicast service.

In the present invention, the logical structure as shown in FIG. 4 is defined for the concept of the multicast service and multicast areas to which the multicast service is provided. That is, the entire multicast area is classified by services, groups and RNCs. This classification can be defined by a member managing entity (i.e., SGSN, BM-SC and GGSN, etc.) of the core network or in the UTRAN in the future. Each RNC manages multicast group member information by multicast services on the multicast areas after receiving them from the multicast group managing entity of the core network.

FIG. 4 shows an example of three types of multicast services, that is, first to third services SER1~SER3.

As shown in FIG. 4, a multicast group may exist for each of the services SER1~SER3. Namely, the first service SER1 is provided to both the multicast groups (A and B), the second service SER2 is provided only to the multicast group A, while the third service SER3 is provided to the multicast group B. The multicast group A includes multicast areas of MA1, MA2, MA4 and MA7, while the multicast group B includes multicast groups of MA3, MA5, MA6, MA8 and MA9.

With such a logical structure, in spite of the same multicast service, a QoS and a transmission content (MBMS data) may differ according to the multicast group and the multicast area. Preferably, the multicast areas MA1~MA9 are mapped geographically. For instance, in consideration of the geographical area, the first RNC manages an area corresponding to the multicast areas MA1, MA4 and MA7, the second RNC manages an area corresponding to the multicast areas MA2, MA5 and MA8, and the third RNC manages an area corresponding to the multicast areas MA3, MA6 and MA9.

Figure 5:
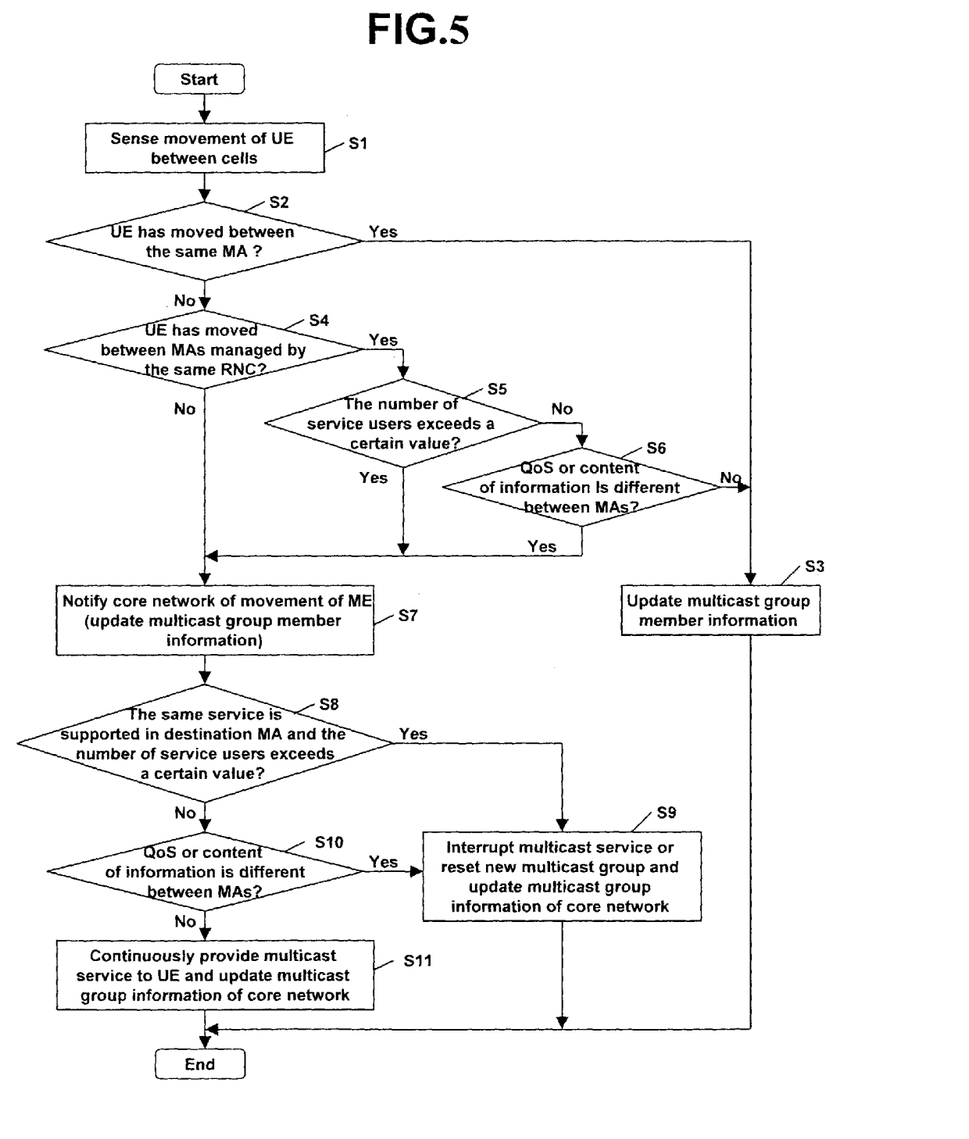
FIG. 5 is a flow chart of a method for managing a multicast group of a mobile communication system in the logical structure for providing the multicast service in accordance with the present invention.

The service should be differently provided in accordance with each area. As shown in FIG. 5, the first service SER1 is provided in all multicast areas MA1–MA9. However, the second service SER2 is provided in only multicast areas MA1, MA2, MA4 and MA7 and the third service SER3 can be provided in only multicast areas MA3, MA5, MA6, MA8 and MA9. Accordingly, a terminal belonging to the multicast areas MA1, MA2, MA4 and MA7 can be provided with the first service SER1 or second service SER2 by joining the multicast group A, while a terminal belonging to the multicast areas MA3, MA5, MA6A MA 8 and MA9 can be provided with the first service SER2 or third service SER3 by joining the multicast group B.

In general, the RNC manages movement of a user terminal between cells. Thus, in order to provide the multicast service, the multicast areas MA1~MA9 should be mapped by cells, the geographical areas. In such a case, one multicast area may include one or more cells, and the entire MBMS service area may include one or more multicast areas MA. In consideration of the geographical area (cell), the first RNC manages a cell corresponding to the multicast areas MA1, MA4 and MA7, the second RNC manages a cell corresponding to the multicast areas MA2, MA5 and MA8, and the third RNC manages a cell corresponding to the multicast areas MA3, MA6 and MA9.

Movement types of the user terminal when the multicast services with the logical structure as shown in FIG. 4 are provided can be expressed as follows.

The first type is that a terminal belongs to the same multicast area MA which provides the same service and moves to a cell managed by the same RNC. For instance, the terminal moves from a cell belonging to MA4 to a different cell belonging to the MA4.

The second type is that a terminal belongs to a different multicast area MA which provides the same service and moves to a cell managed by the same RNC. For instance, the terminal moves from a cell belonging to MA1 to a cell belonging to the MA4.

The third type is that a terminal belongs to a different multicast area MA which provides the same service and moves to a cell managed by a different RNC. For instance, the terminal moves from a cell belonging to MA1 to a cell belonging to MA2.

The fourth type is that a terminal belongs to a different multicast area MA which provides a different service and moves to a cell managed by the same RNC. For instance, the terminal moves from a cell belonging to MA2 to a cell belonging to MA5.

The fifth type is that a terminal belongs to a different multicast area MA which provides a difference service and moves to a cell managed by a different RNC. For instance, the terminal moves from a cell belonging to MA2 to a cell belonging to MA3.

According to the movement type of the terminal, the RNC needs to provide the MBMS member managing entity (e.g., one of SGSN, BM-SC, GGSN) with the movement information of the terminal. The reason is because if the terminal being currently provided with the MBMS service moves to a different MA where the same service is not provided, the MBMS member managing entity needs to update the MBMS group member information and reset an MBMS service area. Besides, that is to prevent unnecessary transmission of a multicast data from the MBMS member managing entity to the RNC where there is no user terminal any longer, and especially, to prevent charging unnecessarily the terminal which has not been provided with the service.

In this respect, the MBMS member managing entity of the core network does not need to know every movement of the cell units of the terminal. Thus, the RNC manages members by services for the MBMS service area for the cells managed by itself, the MBMS multicast area and the multicast area managed by itself, based on which the RNC gives information provided it satisfies a specific condition to the MBMS member managing entity, rather than giving every movement information of terminals.

In detail, the RNC does not always provide information on the first and second movements out of the five types movement examples to the MBMS member managing entity but provides movement information of a corresponding terminal to the MBMS member managing entity only if the same service is not supported between MAs, if the number of service users exceeds a predetermined number in spite of the fact that the same service is supported between the MAs, or if a QoS or a content of information is different between MAs.

FIG. 5 is a flow chart of a method for managing a multicast group member of a mobile communication system according to movement of a terminal in accordance with the present invention.

The RNC manages the multicast group member information by multicast services on the multicast areas managed by itself and selectively informs the core network of movement of a terminal.

First, when a terminal starts moving between cells (step S1), the RNC checks whether the movement of the terminal is made between cells in the same multicast area MA (step S2). If the terminal is moved between cells in the same MAs, the RNC does not inform the MBMS member managing entity of the movement of the terminal, simply updates the multicast group member information that the RNC itself manages, and provides a multicast service to the terminal (step S3). That is, it's the first type of the five movement cases, where the movement of the terminals is not informed to the multicast group managing entity.

In the second step (step S2), if the terminal movement is not made between cells in the same MA, the RNC checks whether the MA to which the terminal has moved (referred to as 'destination MA', hereinafter) is an MA managed by itself (step S4). If the destination MA is not one the RNC itself manages, since the number of group members is changed, the RNC updates the multicast group member information that the RNC itself manages, and notifies the multicast group managing entity of the movement of the terminal (UE) (step S7).

If the terminal movement is made between the cells in the MA that the RNC itself manages, the RNC checks whether the same multicast service is supported in the two MAs and whether the number of multicast users exceeds a predetermined number in the destination MA (step S5). If the condition of the step S5 is satisfied, the RNC checks whether the QoS or the content of the information are the same between the MAs (step S6). If the conditions of the steps S5 and S6 are all satisfied, the RNC does not notify the multicast group managing entity of the movement of the terminal and performs the operation of the step S3.

If, however, the condition of the step S5 is not satisfied or if the condition of the step S5 is satisfied but the condition of the step S6 is not satisfied, the RNC updates the multicast group member information and notifies the multicast group managing entity of the movement of the terminal (UE) (step S7).

That is, in the case of the second type of terminal's movement, the RNC notifies the multicast group managing entity of the terminal's movement only when a specific condition is satisfied. Meanwhile, in the case of the third to fifth types of terminal's movement, the RNC necessarily notifies the multicast group managing entity of the terminal's movement.

Thereafter, the RNC checks whether the destination MA supports the same multicast service and the number of corresponding service users exceed a predetermined number (step S8). In addition, the RNC checks whether the QoS or the content of information are the same between the MAs. If the number of service users exceeds the predetermined number or if the QoS or the content of information is not the same between the MAs, the RNC interrupts the multicast service to the terminal, or resets a fresh multicast group and updates the multicast group information of the multicast group managing entity (step S9).

If, however, the number of service users does not exceed the predetermined number and the QoS or the content of information is the same between the MAs, the RNC keeps providing the multicast service to the terminal which is located in the destination MA and updates the multicast group information of the multicast group managing entity with the multicast group information updated in the step S7 (step S11).

Then, the multicast group managing entity controls the MBMS data transmitted to the terminal through the RNC on the basis of the updated multicast group information such that, for example, the MBMS data is not transmitted to an RNC where there is no terminal.

As so far described, the method for managing a multicast group of a mobile communication system of the present invention has the many advantages.

That is, first, since the RNC notifies the core network of the terminal's movement selectively on the basis of the multicast group member information by multicast services on the multicast area, the network resource can be effectively used, and especially, unnecessary transmission of terminal's movement information from the RNC to the multicast group managing entity of the core network can be prevented.

In addition, since the RNC judges as to whether a service can be supported in the destination multicast area on the basis of the number of service users, the MBMS member managing entity is prevented from unnecessarily transmitting a multicast data to an RNC which does not have a terminal to be managed, and especially, the RNC can provide the multicast service continuously to the terminal belonging to the destination multicast area.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for managing a multicast group in a mobile communication system providing a multimedia broadcast/multicast service (MBMS) to a multicast group consisting of a plurality of terminals, comprising:
   comparing movement information of a terminal and multicast group member information and determining whether to selectively notify a core network of the movement of the terminal based on the comparison, thereby minimizing unnecessary signaling from a network controller (RNC) to a core network,
   wherein if the terminal is moved to a multicast area (MA) that the RNC manages and the corresponding MA can provide an MBMS service, the RNC updates the multicast group member information and does not notify the core network of the movement of the terminal.

2. The method of claim 1, wherein the multicast group member information is information by multicast services on multicast areas managed by one RNC.

3. The method of claim 2, wherein an initial value of the multicast group member information is provided from a multicast group managing entity of the core network.

4. The method of claim 2, wherein the multicast group managing entity is one of broadcast multicast-service center (BM-SC), a serving GPRS support node (SGSN) and a gate GRPS (GGSN).

5. The method of claim 1, wherein if a terminal is moved to an MA that the RNC does not manage, the RNC updates the multicast group member information and notifies the core network of the movement of the terminal.

6. The method of claim 1, wherein if the terminal is moved to a multicast area (MA) that the RNC manages and the RNC can not provide the MBMS service, the RNC updates the multicast group member information and notifies the core network of the movement of the terminal.

7. The method of claim 1, wherein if the terminal moves to a multicast area (MA) that the RNC does not manage and the corresponding MA can not support the MBMS service, the RNC resets a new multicast group and updates the multicast group information of the core network.

8. The method of claim 1, wherein if the terminal moves to a multicast area (MA) that the RNC does not manage and the corresponding MA supports the MBMS service, the RNC updates the multicast group information of the core network.

9. A method for managing a multicast group in a mobile communication system providing a multimedia broadcast/multicast service (MBMS) to a multicast group consisting of a plurality of terminals, comprising
   receiving an initial value of multicast group member information from a multicast group managing entity of a core network;
   determining movement information of the terminal when the terminal is moved between multicast areas (MAs);
   comparing by a network controller (RNC), the movement information of the terminal and the multicast group member information; and
   selectively notifying the core network of the movement of the terminal by a network controller (RNC) according to the comparing,
   wherein if the terminal is moved to a multicast area (MA) that the RNC manages and the corresponding MA can provide an MBMS service the RNC updates the multicast group member information and does not notify the core network of the movement of the terminal.

10. The method of claim 9, wherein the multicast group member information is information by multicast services on a multicast area (MA) that one RNC manages.

11. The method of claim 9, wherein the multicast group managing entity is one of a broadcast multicast-service center (BM-SC), a serving GPRS support node (SGSN) and a gateway GPRS (GGSN).

12. The method of claim 9, wherein if a terminal is moved to an MA that the RNC does not manage, the RNC updates the multicast group member information and notifies the core network of the movement of the terminal.

13. The method of claim 9, wherein if the terminal is moved to a multicast area (MA) that the RNC manages and the RNC can not provide the MBMS service, the RNC updates the multicast group member information and notifies the core network of the movement of the terminal.

14. The method of claim 9, wherein if the terminal moves to a multicast area (MA) that the RNC does not manage and the corresponding MA can not support the MBMS service, the RNC resets a new multicast group and updates the multicast group information of the core network.

15. The method of claim 9, wherein if the terminal moves to a multicast area (MA) that the RNC does not manage and the corresponding MA supports the MBMS service, the RNC updates the multicast group information of the core network.

16. The method of claim 9, wherein if a number of users for a certain service exceeds a predetermined number in the multicast area, the RNC notifies the multicast group managing entity of the movement of the terminal.

17. The method claim 9, wherein if a quality of service (QoS) or a content of information is different between the multicast areas, the RNC notifies the multicast group managing entity of the movement of the terminal.

18. A method of managing a multicast group in a mobile communication system providing a multimedia broadcast/multicast service (MBMS) to a multicast group consisting of a plurality of terminals, comprising:
   detecting a movement of a terminal with respect to multicast areas (MAs);
   determining whether the moved terminal belongs to a same multicast area or a different multicast area;
   determining whether the moved terminal is handled by a same network controller (RNC) or a different RNC;
   determining whether a multicast area of the moved terminal provides a same MBMS service or a different MBMS service;
   defining movement information of the terminal based upon all three said determining; and
   conditionally notifying a core network of the movement of the terminal according to the defined movement information of the terminal.

19. The method of claim 18, wherein if the moved terminal belongs to the same multicast area which provides the same MBMS service and handled by the same RNC, the RNC does not notify the core network of the movement of the terminal.

20. The method of claim 18, wherein if the moved terminal belongs to the different multicast area which provides the same MBMS service and handled by the same RNC, the RNC does not notify the core network of the movement of the terminal.

21. A method of multicast data in a mobile communication system providing a multimedia broadcast/multicast service (MBMS), the method comprising:
   receiving a service announcement and a service notification provided by a network;
   registering a multicast group to receive a specific multicast service;
   receiving the specific multicast data from a core network via a network controller (RNC) after registering;
   moving from one location to other location while receiving the specific multicast data;
   wherein, after the moving, the RNC performs:
      determining whether the moved terminal belongs to a same multicast area or a different multicast area;
      determining whether the moved terminal is handled by a same RNC or a different RNC;
      determining whether a multicast area of the moved terminal provides a same MBMS service or a different MBMS service;
      defining movement information of the terminal based upon all three said determining;
      conditionally notifying a core network of the movement of the terminal according to the defined movement information of the terminal; and
   continuously receiving the specific multicast data from a core network without any interruption from a network.

* * * * *